(12) United States Patent
Karniely et al.

(10) Patent No.: US 8,149,740 B2
(45) Date of Patent: Apr. 3, 2012

(54) METHOD AND APPARATUS FOR DISTRIBUTED CONFERENCES

(75) Inventors: Haim Karniely, Holon (IL); Joseph Gray, Yavne (IL)

(73) Assignee: Interwise Ltd., Ben-Gurion Airport (IL)

( * ) Notice: Subject to any disclaimer, the term of this patent is extended or adjusted under 35 U.S.C. 154(b) by 1254 days.

(21) Appl. No.: 11/789,835

(22) Filed: Apr. 25, 2007

(65) Prior Publication Data

US 2008/0267094 A1    Oct. 30, 2008

(51) Int. Cl.
H04L 12/16    (2006.01)

(52) U.S. Cl. ........................................ 370/260; 370/270

(58) Field of Classification Search ............ 370/260–271
See application file for complete search history.

(56) References Cited

U.S. PATENT DOCUMENTS

| | | | |
|---|---|---|---|
| 6,438,111 B1 * | 8/2002 | Catanzaro et al. | 370/260 |
| 6,989,856 B2 * | 1/2006 | Firestone et al. | 348/14.09 |
| 7,173,910 B2 * | 2/2007 | Goodman | 370/252 |
| 7,379,450 B2 * | 5/2008 | Gu et al. | 370/352 |
| 7,426,191 B2 * | 9/2008 | Salesky et al. | 370/260 |
| 7,626,951 B2 * | 12/2009 | Croy et al. | 370/261 |
| 7,636,022 B2 * | 12/2009 | Shenoi | 331/177 R |
| 7,683,923 B2 * | 3/2010 | Zhang et al. | 348/14.01 |
| 2008/0112336 A1 * | 5/2008 | Gray et al. | 370/260 |
| 2008/0260132 A1 * | 10/2008 | Zhang et al. | 379/202.01 |

* cited by examiner

*Primary Examiner* — Hong Cho
(74) *Attorney, Agent, or Firm* — Greenblum & Bernstein, P.L.C.

(57) ABSTRACT

A method and apparatus for enabling an event such as a telecollaboration or conference event in a communication network. The apparatus is tree-structured, and comprises a main site and one or more descendent sites, each site comprising one or more servers. Each site is a parent site, a descendent site, or both. Two sites may be connected via a dedicated or controlled connection. The apparatus further comprises client devices, each client device connecting to one site. The method of the disclosed invention comprises passing information between a client device and a server or between two servers exactly once. The information is propagated by each server to all the components connected to the server, i.e. the parent site if any, descendent sites if any, and client devices if any, excluding the component from which the server received the information.

19 Claims, 7 Drawing Sheets

METHOD AND APPARATUS FOR DISTRIBUTED CONFERENCES

BACKGROUND OF THE INVENTION

1. Field of the Invention

The present invention relates to the field of controlling data flow in a hierarchical environment in general, and to a method and system for efficient transfer of information during a conference or telecollaboration event in particular.

2. Discussion of the Related Art

A system for distributing information between clients is well known in the art. Such systems can be used, for example, for offering multiple participants the option to participate in events from distributed locations. Such events can include conference calls involving video or audio, as well as telecollaboration events. Telecollaboration relates to the cooperation of multiple, possibly remote parties in concurrent working on a task, having a discussion comprising of audio, video, or one or more shared documents or applications, such as a written document, a presentation, instruction codes or any other type of document. When participating in an event, a party can connect via a telephone of any kind, a computer, or a telephone and a computer, wherein the abilities of a participant are limited to those offered by the device he or she is using, for example a person using a computer will be able to participate in shared work on a document, while a person using a simple telephone is limited to sending and receiving audio streams. In order to provide adequate level of service, the usage of multiple servers cooperating to bridge a single event has been introduced, wherein each server is a computing platform connected to a network such as the internet, and/or to a PSTN switch. Using a distributed environment, any server can be connected to one or more other servers, and any participant can connect to any of the servers. Thus, a server can be connected to other servers and/or to clients simultaneously.

Streams sent or received by servers and distributed to all client devices, especially when audio data is sent or received, generally put a heavy burden on a communication system and consume substantial bandwidth resources. In addition, when sending streams from one component of a system to another via a network, the route taken can not always be anticipated. Moreover, the route is generally not the shortest possible route between the two components, thus putting extra burden on the network, and creating delays, slowing down the transfer, limiting the number of participants that can participate in an event and exposing the data to security hazards. Another difficulty in handling events is that the optimal number and distribution of servers which are required for ensuring adequate quality of service as well as efficient usage of resources can not always be anticipated, due to lack of knowledge about the number and distribution of participants or the network load during the event.

There is therefore a need for a method and apparatus that ensure efficient routing of streams comprising audio, video or other data between two servers, and between a server and a client during a conference or a telecollaboration event. The method and apparatus should also enable dynamic allocation and distribution of servers for an event, in order to ensure high level of service as well as economical usage of resources.

SUMMARY OF THE PRESENT INVENTION

It is an object of the present invention to provide a novel method for supplying an efficient solution to conferencing environment. The environment is tree-structured, wherein each site has a parent site or one or more descendent sites, or both. Each site comprises one or more servers, and each client is connected to one server. The information is sent between any two nodes along the shortest path in the tree, and is further sent exactly once, and is distributed by the server to all other nodes connected to it.

There is thus provided in accordance with an exemplary embodiment of the invention a method for distributing an information stream during an event, in a hierarchical distributed apparatus operating in a communication network, the network comprising two or more sites, each of the sites comprising one or more servers, wherein a client device is connected to each of the two or more sites, the method comprising the steps of: transmitting a first information stream by one source to a first destination connected to the source by a first connection, the source being the client device, or the first destination being a site; if a second destination other than the source is connected to the first destination in a second connection, transmitting a second information stream from the first destination to the second destination, the second destination including one or more of the following: the client device; a descendent site; or a parent site, wherein the first or the second information stream are transmitted once between the source and the first destination or between the first destination and the second destination. Within the method, the second step is optionally repeated for each second destination to which the second information stream is transmitted, such that: the first destination becomes the source; the second destination becomes the first destination; and a product of processing or multiplexing the second information stream becomes the second information stream. The method can further comprise a step of transforming the first information stream into the second information stream. Within the method, the step of transforming the first information stream into the second information stream optionally comprises any of the group consisting of: multiplexing the first information stream with a third information stream; compressing the first information stream; decompressing the first information stream; and digitizing the first information stream. The method can further comprise a step of connecting an additional server during the event. The additional server is optionally located in a third site, the third site different from the two or more sites. The two or more sites can be connected in a dedicated or controlled connection. The first or the second information streams are transmitted between the source and the first destination or between the first destination and the second destination via a minimal number of servers. Optionally, the second information stream is the first information stream. The client device is a telephone or a computing platform. The server is optionally a computing platform.

Another aspect of the disclosed invention relates to a tree-structured distributed apparatus for enabling an event with one or more participants, the apparatus operating in a communication network, the apparatus comprising: a main site, the main site comprising one or more first servers; one or more descendent sites, each descendent site comprising one or more second servers, wherein each descendent site is connected to a parent site and each parent site or the main site is connected to a descendent site; a client device connected to the main site or to a descendent site, wherein the participants participate in the event through the client device, by transmitting or receiving an information stream to or from the at least one first or the second server. Within the apparatus, the main site or the descendent site can be behind a firewall, and the main site or the descendent site is in the internet. The first server is optionally connected to the second server in a controlled or dedicated connection. The client device is optionally connected to the first server or to the second server in a not controlled and not dedicated connection.

BRIEF DESCRIPTION OF THE DRAWINGS

Non-limiting embodiments of the invention will be described with reference to the following description of exemplary embodiments, in conjunction with the figures. The figures are generally not shown to scale and any sizes are only meant to be exemplary and not necessarily limiting. In the figures, identical structures, elements or parts that appear in more than one figure are preferably labeled with a same or similar number in all the figures in which they appear, in which.

DETAILED DESCRIPTION OF THE PREFERRED EMBODIMENT

Figure 1:
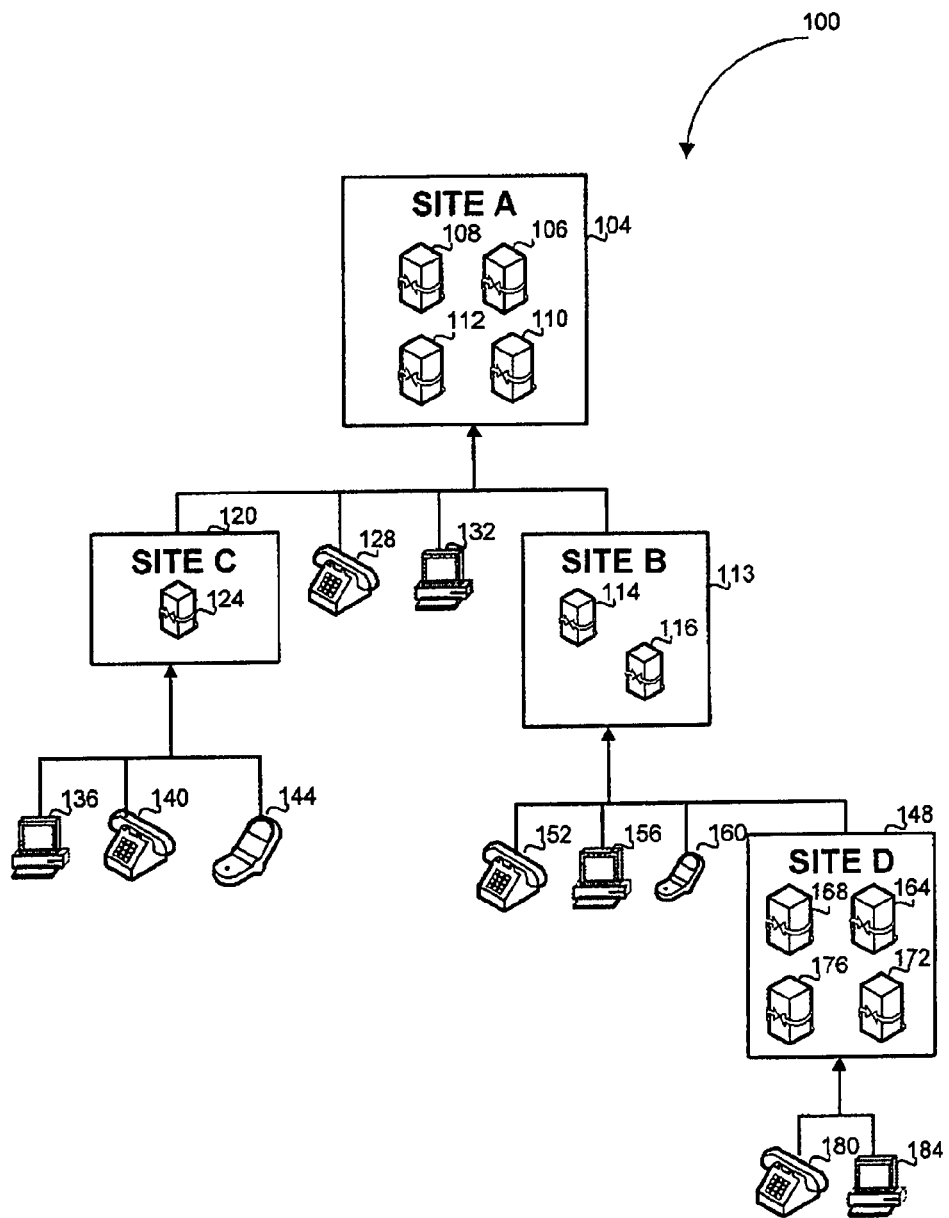
FIG. 1 is a schematic illustration of an arrangement of servers and clients, in accordance with a preferred embodiment of the disclosed invention.

The present invention overcomes the disadvantages of the prior art by providing a novel solution which enhances and adds to the capabilities of currently available methods and systems for conference or telecollaboration events, generally referenced as events.

In this context, the term telecollaboration relates to a cooperation of multiple, possibly remote parties in concurrent working on a task, having a discussion comprising of audio and/or video and/or one or more shared documents or applications, such as a written document, a presentation, instruction codes or any other type of document. Any party can be connected via a telephone of any kind, a computer, or a telephone and a computer. Thus, data transferred within a call can include all types of data, such as digital voice, analog voice, voice over IP, video, raw data, or the like. A conference may include a telephone conference, a video conference, a computer network or any combination of any of the above.

According to a preferred embodiment of the disclosed invention, multiple servers, residing on multiple geographically distributed sites are cooperating in carrying out a distributed event. In each site, one or more servers are active during an event, according to the number of client devices connected to the event via that site. The sites are organized in a tree-like hierarchy, wherein preferably one site is a main site, and each site is connected to a parent site. Each site is optionally connected to one or more descendent sites, each of which is connected only to that site as a parent site. Each site may be a parent site, a descendent site, or both. Each client, comprising a person using a client device running a client application, such as a fixed telephone, a mobile telephone, a computer or any other communication device, is connected to one site. Each site is therefore optionally connected to one or more of the following: a parent site, one or more descendent sites, or one or more clients. The hierarchical structure ensures that there is exactly one path from any client device to any other client device connected to the same conference. The path between two clients passes through one site when the two clients are connected to the same site, or through additional sites, which may include the main site or not, depending upon whether the two clients have a common ancestor other than the main site.

Optionally, there is one active server in each site participating in an event. However, one or more servers can join an active server in a particular site, such that two or more servers will share the load handled by that site. Thus, the number and distribution of servers participating in an event can be changed dynamically, according to the possibly varying number and distribution of participants in the event. A first server in a new site preferably becomes active in an event upon the first client connecting to the event via that site. When a particular server in a particular site is fully loaded, e.g. all its connections are occupied, or alternatively the performance it offers falls below a predetermined threshold, an additional server within the same site is added to the event and one or more participants connect through the newly added server in the existing site. The servers within a particular site are not required to provide the same functionality, and can share tasks rather than for example sharing connections. Thus, one server can be responsible for transferring streams to other servers, while others are responsible for client device connections. When a site contains just one server, the server can be identified with the site. Otherwise, the site can be identified with a certain server residing in the site, which may be the first server to connect to an event, the fastest server or any other server. When a site sending or receiving information during an event is mentioned, the meaning is that one or more servers within the site send or receive the information, and that the information is shared, sent, or is otherwise accessible to the other servers in the site which are active during the event. In another preferred embodiment, one or more servers within a site can be responsible for receiving information, while one or more other servers can be responsible for sending the information to other components of the system.

The unique tree-structure, which ensures a single path between any two clients, enables efficient transfer of information between all nodes in the system. The efficiency is enabled by each site sending a stream comprising audio, video, data or other information only to a relatively small number of destinations, including at most: its parent site, its descendent sites and the clients connected directly to it. Sending a stream only to a limited number of destinations saves bandwidth and reduces the load and delay of the servers within the sites and the network. The stream sent by each site or each server can be an original stream as received from a client device or from another server connected to it, or a stream which is a product of transforming one or more streams, such as a stream which is multiplexed of multiple streams sent from one or more client devices and/or from one or more servers, a compressed stream, or the like.

When two sites are connected to each other, i.e. they are a descendent or a parent of each other, the sites are preferably connected directly via a dedicated or controlled connection. Thus, data streams exchanged between them are sent directly or via a controlled path and not in an arbitrary path, as often happens when using IP protocol over the public internet, which involves packets of the stream passing unexpected routes through multiple serves and routers. In one preferred but not necessary embodiment, such controlled connection can be achieved through a peering agreement between server operators. However, well distributed servers also provide directed routes rather than arbitrary ones. The direct communication eliminates security holes as well as reduces delays and ensuring faster response times.

Referring now to FIG. 1, a schematic illustration of an arrangement of servers and clients, according to a preferred embodiment of the disclosed invention. The components participating in an event, generally referenced 100 comprise a main site, being site A 104. Site A 104 comprises four servers, 106, 108, 110 and 112. Each of servers 106, 108, 110 or 112, is preferably a computing platform such as a personal computer, a mainframe computer, a server, a network computer, a network appliance or the like, comprising a CPU, memory, and storage (not shown) for storing information and instructions relevant to the teleconferencing system or to a specific event. The components may include various computer readable media having suitable software thereon, for example, diskettes, CD-ROM, or flash RAM. It is not required that all servers 106, 108, 110 or 112 participate in each event. Rather, one server participates in an event, and additional ones are added upon demand, as will be further detailed below. Exemplary devices 128 and 132 connect directly to one or more of the servers in site A 104. Devices 128 or 132 can comprise a telephone of any type, such as a landline telephone, a mobile telephone, a voice over IP telephone, a handheld device, or the like. Devices 128 and 132 can also comprise a computer with a network connection, such as a personal computer, a network computer or other computing platforms. Further connected to site A 104 are site B 113 and site C 120. Site B 113 comprises two servers, being 114 and 116 and site C 120 comprises server 124. Site A 104, in addition to being the main site, is also the parent site of site B 113 and site C 120, wherein site B 113 and site C 120 are the descendents of site A 104. Devices 136, 140 and 144 connect directly to site C 120, while devices 152, 156 and 160 connect to site B. Further connected to site B 113 is site D 148, which comprises servers 162, 168, 172 and 176. Devices 180 and 184 connect directly to site D. The components of the exemplary structure of FIG. 1 are connected via a communication network. The servers are preferably connected via a data communication network, such as an intranet, the internet or others, while a client device may connect to a site or to a server within a site via a data communication network, a telephony communication network or the like. It will be apparent to a person of ordinary skill in the art that the illustrated scheme is exemplary only, and is intended merely to demonstrate the tree-structure of the sites, the possible different number of servers within each site, and the various available types of devices. The illustration should not be construed as limiting the disclosed invention to a particular structure. It will also be appreciated that when a participant such as a participant using device 128 or 132 connect to the system, he or she may or may not be aware of the site they are connecting to, but they are not aware of which server within the particular site they are connecting to. Rather, the addition or removal of additional servers from a particular event occurs according to the load on a particular server or other system parameters and not according to a specific user request. Moreover, not all servers must be equal. There may be one or more servers responsible for predetermined functionality, such as sending a stream. Such server should be the first to become active when a participant connects to the site, while additional servers do not perform this functionality and may become active only to support the required number of participants.

Having the tree-structure shown in FIG. 1, it will be apparent that a single path exists between any two devices in the system. Thus, the path from device 140 to device 144 passes through site C 120 only, while the site from device 140 to device 180 pass through site C 120, site A 104, site B 113 and site D 148.

It will also be apparent that the each servers such as 106, 108, 110, 112, 114, 116, 124, 164, 148. 172 or 176 and each device such as 128, 132, 136, 140, 144, 152, 156, 160, 180, 184 executes one or more applications for performing the disclosed methods. The applications are modules, libraries, executables or other collections of computer instructions, programmed in any programming language such as C, C#, C++, Java or the like, and under any development environment, such as .Net, J2EE, or the like. The servers preferably execute server-side applications, wherein the devices execute client-side applications, wherein each client-side application communicates with one or more server side applications. In a preferred embodiment, when a server is accessed in association with multiple events, i.e. is hosting multiple events, then multiple instances of one or more server-side applications may be executed by the server.

In an alternative embodiment, one or more servers can be implemented as firmware ported for a specific processor such as digital signal processor (DSP) or microcontrollers, or as hardware or configurable hardware such as field programmable gate array (FPGA) or application specific integrated circuit (ASIC).

Figure 2:
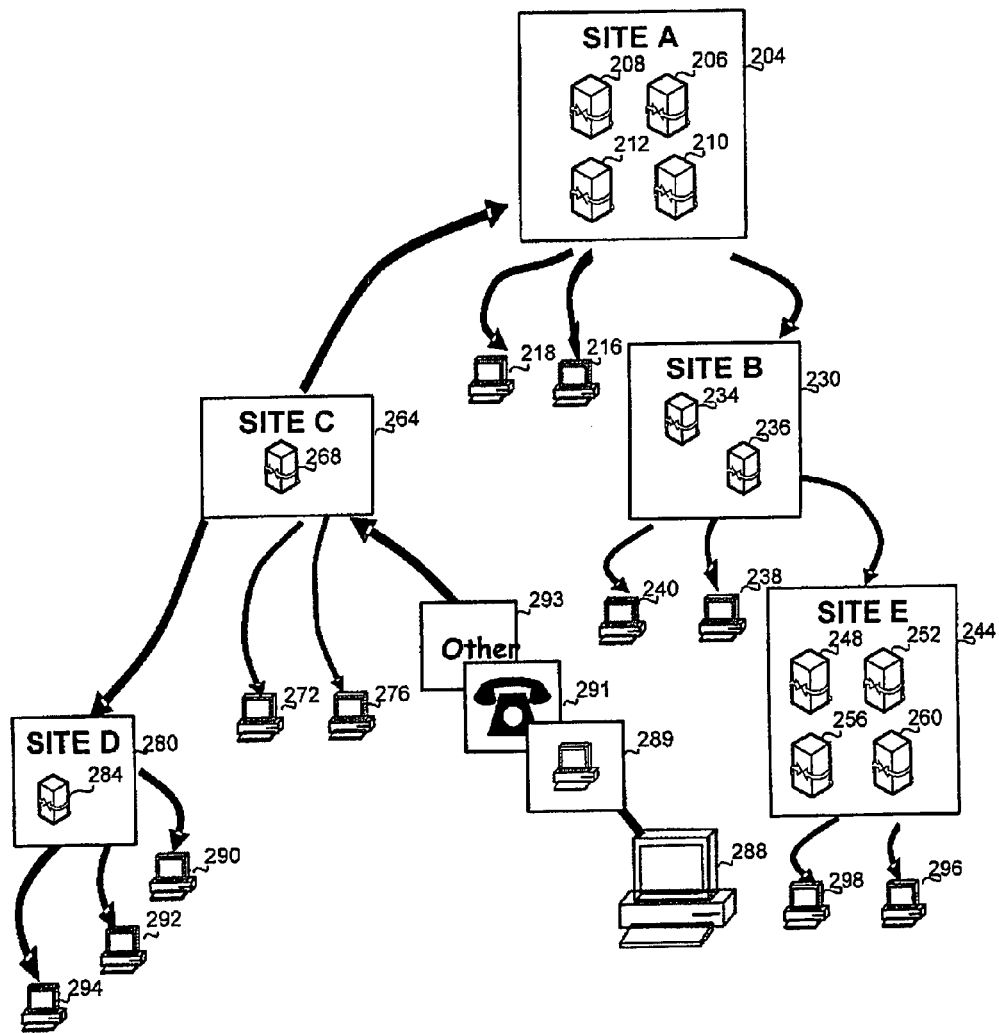
FIG. 2 shows the flow of information from one participant to all other participants during an event, in accordance with a preferred embodiment of the disclosed invention.

Referring now to FIG. 2, showing the flow of information from one participant to all others during an event, when a system according to the disclosed invention is used. The system shown in FIG. 2, similarly to the system of FIG. 1 is schematic only, and is also non-limiting in the number of servers active in each site, and the types of client devices. In FIG. 2, the participant using device 288 is sending information which he wishes to share with other participants of the event. Device 288 may be a computing platform 289 of any type, such as a personal computer, a network computer, a mainframe computer or others, a telephone 291, such as a landline phone, a cellular phone, a Voice over IP (VoIP) phone or any other, or any other device 293 through which the user can connect to the event, such as a handheld device or others. Once the user using device 288 transmitted the information, be it voice, data, VoIP or any other type of data, the data is sent to the server to which client device 288 is connected to, being server 268 within site C 264. Server 268 of site C 264, or one of them if there are more than one server within site C 264, first performs necessary operations on the data, for example digitization of data arriving as analog data, multiplexing with another stream if required, compression, or the like. Server C 264 then transmits the stream, whether the original one or a processed one to: a) All other devices connected directly to site C 264, i.e. devices 272 and 276; b) One server within any descendent site, being server 284 within site D 280 in the configuration shown in FIG. 2; and c) a server within its parent site, being one of servers 206, 208, 210, 212 within site A 204. Site A then repeats the operations, by first performing multiplexing if required, and then transferring the multiplexed or the original stream to: a) the devices connected directly to a server within site A 204, i.e. devices 216 and 218; b) all descendent servers, i.e. a server such as 234 or 236 within site B 230. Site A 204 has no parent site, so it transfers the stream to: a) the client devices connected to it, 272 and 276, and b) its descendent devices, i.e. site B 230 and site C 264. Optionally, for example when the stream is not multiplexed, site A 204 can avoid transferring the stream to the site that sent the stream, i.e. site C 264 and thus, in the example of FIG. 2, will send the stream only to Site B 230 and to devices 216 and 218. Site B will transfer the stream to: a) devices 238 and 240; and b) site E 244, which will transfer it further to devices 296 and 298. Thus, information between any first site and a second site is sent exactly once, regardless of the number of clients or the number of descendent servers connected to the first or the second site, or the parent-descendent relationships between the first and the second sites. This single transfer keeps the volume of the sent information to minimum, while ensuring that each client device will receive the information.

Figure 3:
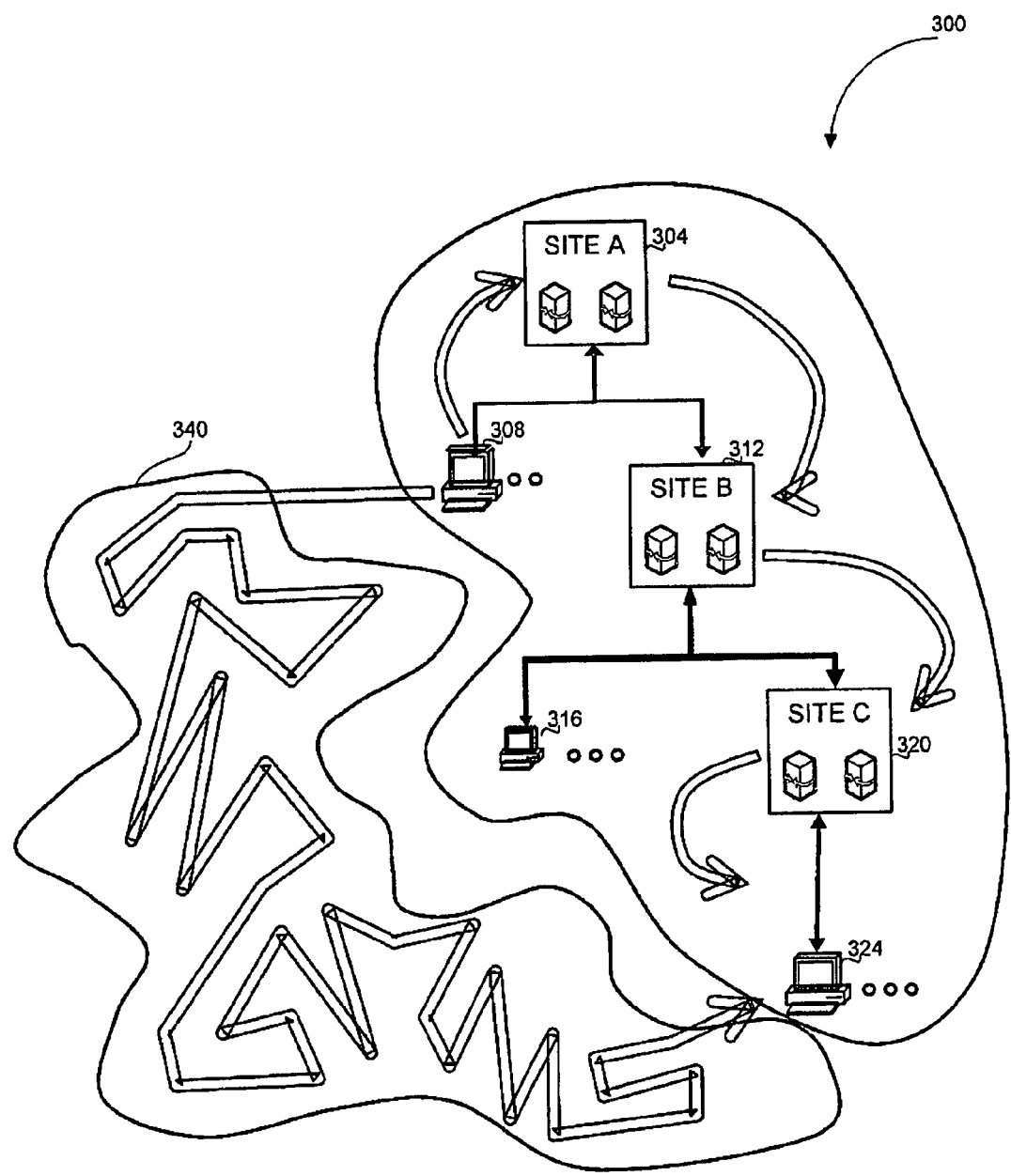
FIG. 3 shows a schematic comparative illustration of the transfer of streams between components when using a preferred embodiment of the disclosed invention, and the transfer in conventional systems.

Referring now to FIG. 3, showing a schematic comparative illustration of the transfer of streams between components when using the disclosed invention, and the transfer in conventional systems. When using conventional systems, wherein clients such as 308 and 324 are connected through the internet and communicate using TCP protocol, streams transferred between the clients typically take a long and unexpected route through various servers, such as the path shown in the left hand side 340 of FIG. 3. The stream can travel undesired distances, pass numerous servers, and thus in addition to the participants suffering time delays which may significantly reduce the quality of the event, the content is also exposed to unnecessary security hazards. Alternatively, when using an apparatus according to the disclosed invention, the associated sites, i.e., 304, 312 and 320 in FIG. 3 are preferably connected through peering agreements, and thus the streams are assured to pass directly between any two connected sites. Preferably, the servers associated with a single site belong to the same local area network. Multiple sites which are part of the same distributed conferencing infrastructure are preferably associated with a wide area network, are hosted by a specific service provider, or hosted by providers that have a peering agreement, thus ensuring the direct or controlled transfer of streams between any two servers within the two sites. Thus information streams flow directly between sites 304 and 312, and between sites 312 and 320, and within each site. The client devices, such as devices 308, 316 and 324 are preferably encouraged to connect to the relevant server (for example server 304 in the case of client device 308) through the same service provider, and thus ensure efficient transfer between the client device and the server it is connected to. Automatic server selection, which is optionally performed by client applications executed by client devices, is preferably designed to pick the best server for each client, which is usually the geographically closest available server. Thus, server distribution which is planned so that more servers are available in geographic proximity to concentrations of clients, performance can enhance the performance. In another alternative, further discussed in association with FIG. 4 below, a client device connects to a server via a local area network (LAN), which also ensures direct transfer of streams.

Figure 4:
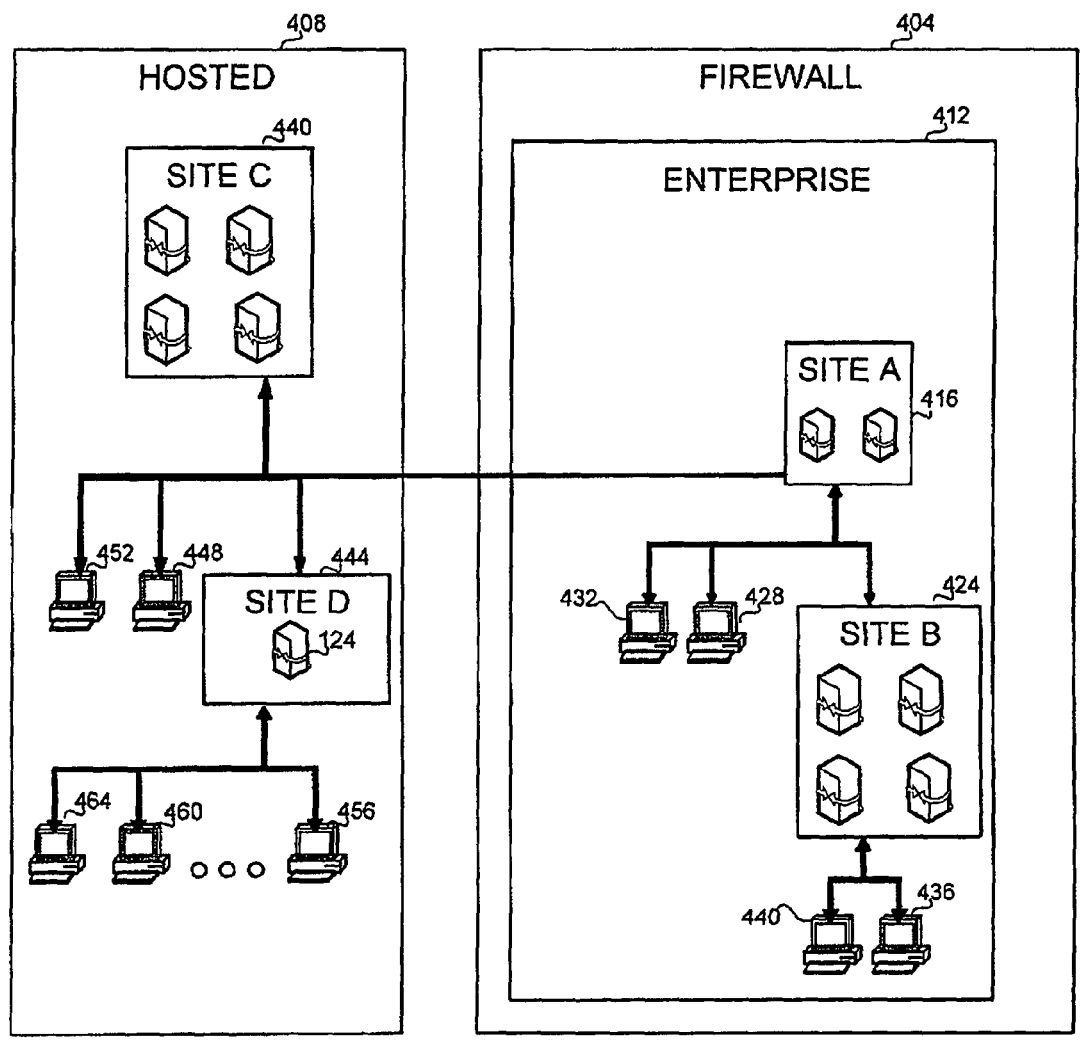
FIG. 4 shows a preferred embodiment of the apparatus, wherein one or more servers associated with one or more sites are within an enterprise, in accordance with a preferred embodiment of the disclosed invention.

Referring now to FIG. 4, showing a preferred embodiment of the apparatus, wherein one or more servers associated with one or more sites are within an enterprise. In the embodiment shown, one or more sites, each containing one or more servers belong to a specific enterprise or organization 412, and are therefore preferably separated from the internet by a firewall 404. Within enterprise 412, the sites are also organized in a hierarchical manner, wherein site A 416 is the common ancestor of the sites within enterprise 412, and site B 424 is a descendent of site A 416. If the system is intended for internal use within enterprise 412 only, site A 416 is also the root site. However, if the system is intended for events with participants external to the enterprise (including, for example enterprise employees participating in an event from a cellular phone or from a remote location), then one or more additional sites such as site C 440 are added to the configuration. In the configuration of FIG. 4, the main site is site C 440, wherein client devices 448 and 452 are connected directly to site C 440, site D 444 which is also hosted by a service provider and has client devices 460 and 464 connected to it, and site A 416 which is within enterprise 416. The specific configuration shown in FIG. 4 can also function if site A 416 is the main site, and has site C 440 as a descendent site. Site C 440 and site D 444 are preferably hosted by one or more service providers. Alternatively, Site C 440 and site D 444 may reside within a firewall of a second enterprise, which holds events in which participants of both enterprises participate. In yet another alternative, a system may comprise the configuration shown in FIG. 4, with additional sites hosted within one or more additional enterprises, as long as the hierarchical structure is maintained. Having a server within the organization provides security as well as enhanced performance to users communicating within the organization, as well as reducing communication load between the organization and the public internet.

Figure 5:
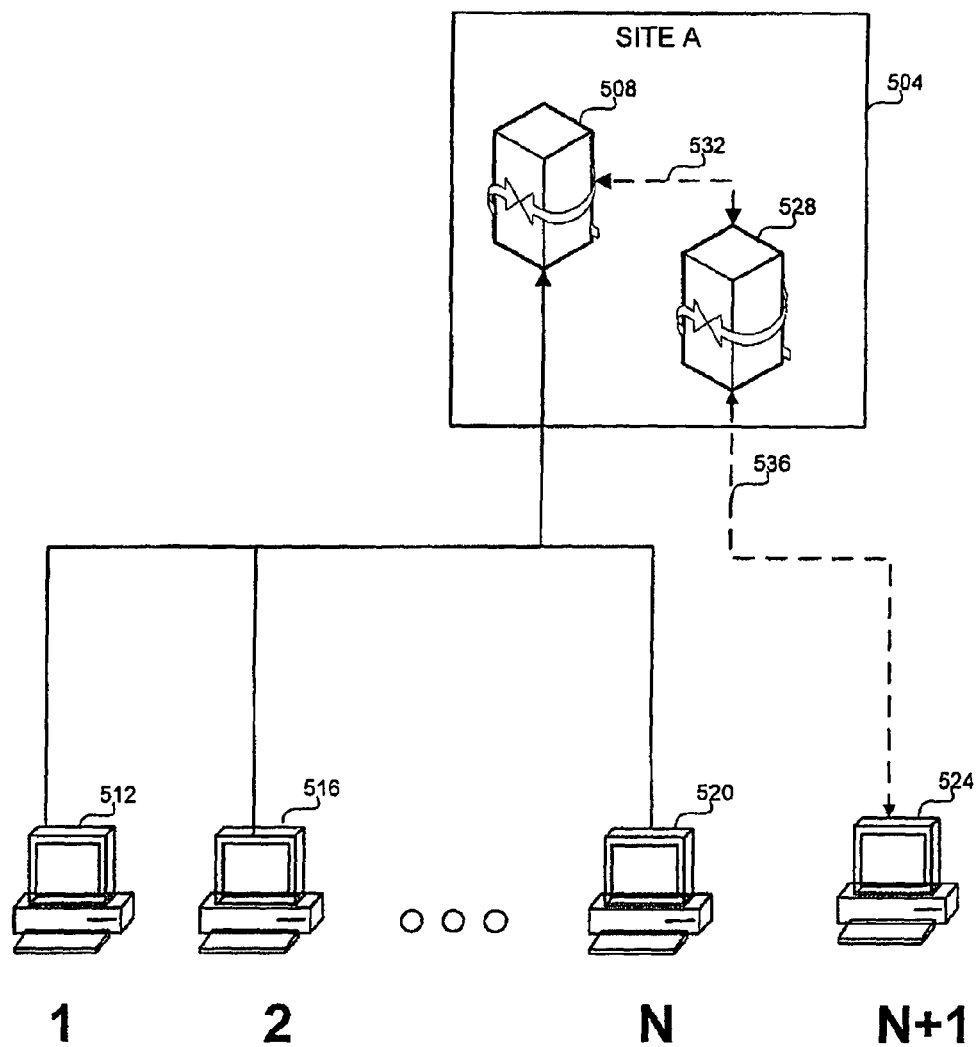
FIG. 5 shows the activation of servers within a particular site, in accordance with a preferred embodiment of the disclosed invention.

Referring now to FIG. 5, showing the activation of servers within a particular site, in accordance with a preferred embodiment of the disclosed invention. The first client device that connects to a site "wakes up" a server in the site that will host the specific event the client wishes to connect to.

In a preferred embodiment, the main site is the first site, and the main server is the first server within the first site to which a client device connects, but additional embodiments can be designed. For example the main site and main server can be predetermined and activated even when no client device is connected thereto. In yet another alternative the main site and main server can be switched according to the participants majority participating in an event, or the like. As additional client devices connect to the same site, they also connect to the first server. Thus, in FIG. 5, when client device 1 (512) connects, it wakes up site A 504, and particularly first server 508. First server 508 can connect to up to a predetermined number of connections, say N. Thus, client devices 512, 516, 520 (if N=3), fewer if N<3, and additional ones if N>3 connect to server 508. Then, once N client devices are connected to first server 508, when client device N+1 (524) wishes to connect to site A 504, a second server 528 wakes up, is connected to first server 508 via connection 532 and is connected to client device N+1 528 via connection 536. The addition of second server 528 is transparent to client devices 512, 516, 520, 524, and to all other sites or servers connected to site A. In addition, server 508 and server 528 can have the same or different functionality, according to design considerations including ease of implementation, efficiency, scalability and others.

Figure 6:
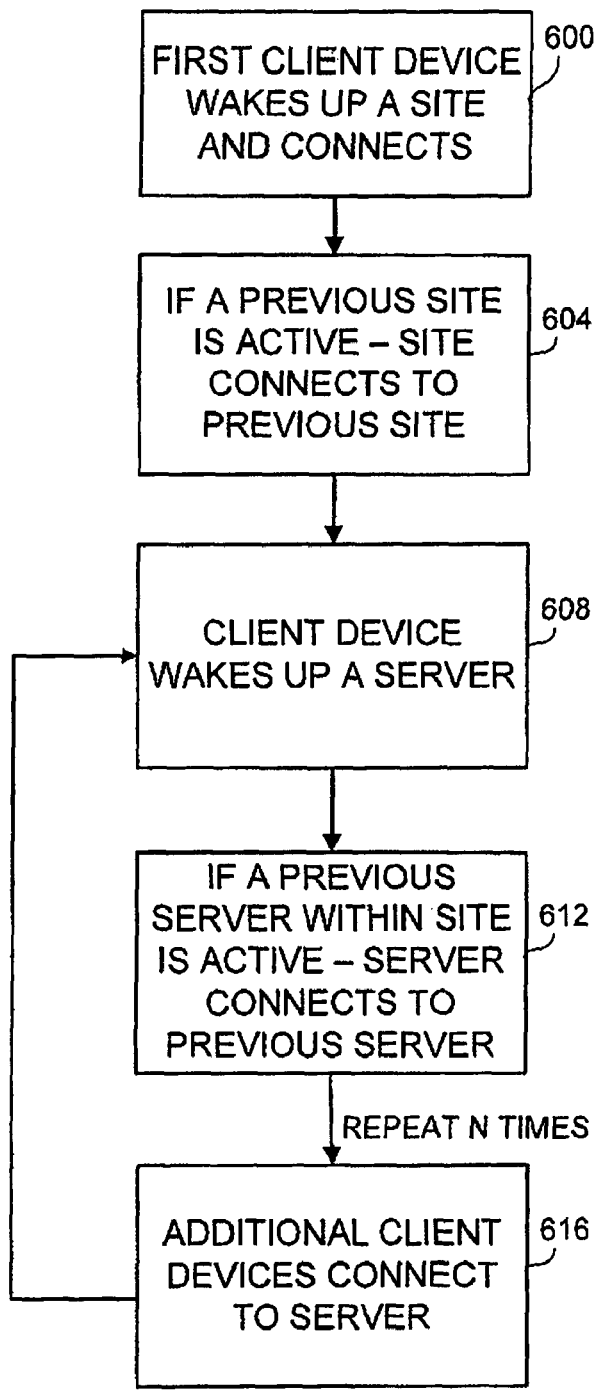
FIG. 6 is a flowchart of the main steps in the activation of servers within a particular site, in accordance with a preferred embodiment of the disclosed invention.
Figure 7:
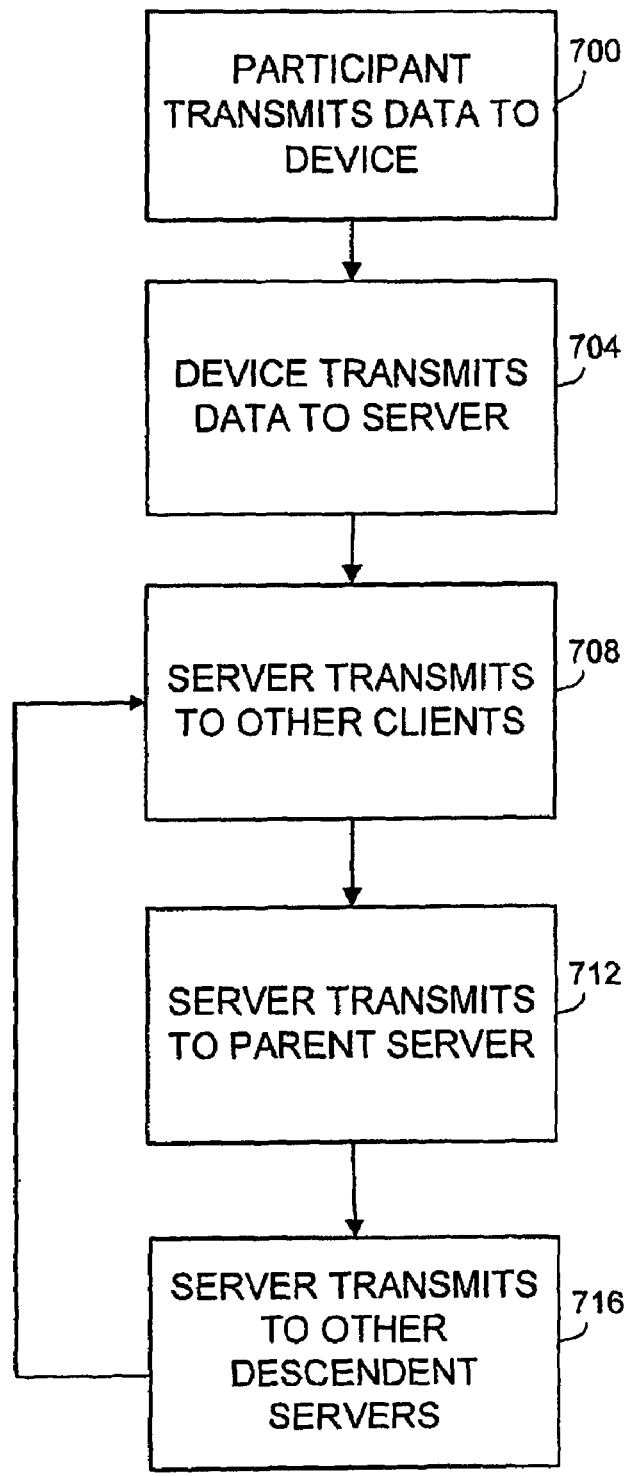
FIG. 7 is a flowchart of the main steps in transferring data between all participants in an event, in accordance with the disclosed invention.

Referring now to FIGS. 6 and 7, showing the main steps associated with establishing a hierarchy of client devices and servers for carrying out an event, and the main steps in transferring data between all participants in an event, in accordance with the disclosed invention, in accordance with the disclosed invention. The steps of FIGS. 6 and 7 are implemented as computer instructions which are executed either on a client device or on one or more of the servers associated with one or more sites. The computer instructions can be implemented in hardware or by software components such as executables, modules, routines or the like.

Referring now to FIG. 6, showing the main steps associated with establishing a hierarchy of client devices and servers for carrying out an event, in accordance with the disclosed invention. Each participant wishing to join a conference or a telecollaboration event chooses the site he or she wishes to connect to. When the participant is using a telephony device, he determines the site he connects to by dialing its number. Typically, a user will dial the number of the server closest to it, in order to keep both the calling price and latency as low as possible. When a user is using a computing device to connect to an event, the computing device will check the connection rate offered by each of the sites, and will choose the site with the best rate, which is typically but not necessarily the one geographically closest to it. When a participant is connecting from within an enterprise, he or she will preferably always connect through the in-site server, if one exists, and thus will avoid crossing the firewall. At step 600, once the first participant, to join an event connects using a client device to a site, the connection wakes up the site. At step 604, if another site is already active in the event, the waking site connects to the already active site. If multiple sites are already connected, the newly joining site chooses the one closest to it, in a similar manner to the site selection performed by a computing platform client device. The connection is carried out such that the new site or the existing one is the parent site and the other one is a descendent. In a preferred embodiment, the first site to wake up is denominated to be the main site, and all other sites are descendents either of the main site or of other sites. Alternatively, a site denominated as a main site always wakes up prior to the event, and all other sites connect to it as descendents. At step 608, a server within the selected site wakes up as a first client device connects to it. If the client device is the first to connect to the site, or if all servers active in the site are loaded to full capacity, then a new server wakes up. At step 612, if there is already an active server in the site (other than the new one), the new server connects to one or more of the active servers. At step 616 additional client devices connect to the server, until its full capacity is reached. Then, as additional participants join, the method will re-invoke step 608 and wake up additional servers. As a first and participants connects to a newly added server, a load balancing process optionally takes place, in which the number of participants is balanced between the active servers, and connections to newly joining additional devices are also distributed between the servers.

Referring now to FIG. 7, showing the main steps in transferring data between all participants in an event, in accordance with the disclosed invention. At step 700, a participant transmits data to the device he or she are connected to. The data can be digital data such as voice, audio or other data, such as data related to telecollaboration, or analog data, such as analog voice. At step 704 the device transmits the data to the server through which it is connected to the event, wherein the transmission is optionally conditioned. For example, if the server sent to the client device a "do not transmit" signal to the device, then transmission will not take place. If transmission did take place, at step 708 the server transmits the stream to all clients connected to it, excluding the client who sent the stream. Step 708 is also reached when the stream is transmitted to the server from another server, in which case the server transmits the stream to all client devices connected to it. At step 712, the server who received the stream transmits, i.e. propagates the stream to its parent server, unless the stream was received from the parent server. At step 716 the server transmits, i.e. propagates the stream to all its descendent servers, unless the stream was received from one of the descendent servers, in which case the stream will not be transmitted back to that server. The process continues, wherein each server that receives the stream will repeat the process and will transmit the stream to: a) the client devices connected to it; b) its parent server; c) its descendent servers. The exception is that the stream will not be sent by a server to the server or device from which the server received the stream. Steps 708, 712, and 716 presented below, which describe the transmission of the stream by a server, can be executed in any required order, or simultaneously. Each server can transmit the stream as received, or perform processing on the stream prior to sending. Such processing comprise analog-to-digital conversion, compression or decompression, multiplexing with other streams, blocking the stream due to a "do not transmit" received from a parent server or additional actions.

The steps of FIG. 7 can be generalized to read as follows: an information source, such as a client device transmits an information stream to a destination, such as a site connected to the source. Then, the first destination transmits the data stream, or a product of processing the information stream to all other destinations connected to the first destination, excluding the source. The other destinations may include one or more or the following: the client devices connected to the first destination, the parent site of the first destination or one or more descendent sites connected to the first destination. The process then continues recursively, such that the first destination becomes the source and the second destination becomes the first destination, until the information stream comprising or based on the first information stream reaches all components of the apparatus. The uniqueness of the process is that each stream is transmitted between two sites, or between a site and a client device exactly once, regardless of the number of client devices or descendent servers connected to a site. In addition, the transfer of a data stream between any two components is performed via a minimal number of intermediate servers.

The disclosed methods and apparatus provide for efficient and secure events such as conference calls, telecollaboration events or the like. The disclosed invention provides a hierarchical structure of sites, wherein one site is a main site, and the others are descendent sites. Each site excluding the main has a parent site and is optionally connected to one or more client devices, such as telephony devices or computing devices. The data transmission within the apparatus is carried out so that each stream is transmitted between two servers at most once, regardless of the number of client devices connected to each of the servers. Within each site involved in an event, one or more servers cooperate in order to accommodate a varying number of participants. The work division between the servers can vary, so that one or more servers are responsible for certain tasks such as transmitting streams, while others are responsible for other tasks, such as receiving connections from client devices.

Preferably, the apparatus is established after strategically located sites are pre-installed, for example within an enterprise, a country or another region, or world-wide. Part of the pre-installation can be establishing peering agreements of a site with other sites, in order to support efficient transmission of streams between sites. Then, sites and servers are added to an event in a dynamic manner, according to the number and location of participants.

In a preferred embodiment of the disclosed invention, a server optionally caches part of the information transmitted to and from it. For example, digital data related for example to telecollaboration or to materials relevant to an event can be cached and transmitted to participants joining an event at a later time. In yet another embodiment, each server transmits audio data according to the available bandwidth between itself and the destination.

The present invention has been described using non-limiting detailed descriptions of embodiments thereof that are provided by way of example and are not intended to limit the scope of the invention. It should be understood that features described with respect to one embodiment may be used with other embodiments and that not all embodiments of the invention have all of the features shown in a particular figure or described with respect to one of the embodiments. It is noted that some of the above described embodiments may describe the best mode contemplated by the inventors and therefore include structure, acts or details of structures and acts that may not be essential to the invention and which are described as examples.

The present invention is not limited to what has been particularly shown and described hereinabove. Structure and acts described herein are replaceable by equivalents, which perform the same function, even if the structure or acts are different, as known in the art. The scope of the present invention is defined only by the claims which follow. When used in the following claims, the terms "comprise", "include", "have" and their conjugates mean "including but not limited to".

The invention claimed is:

1. A method for distributing information in a hierarchical communication network during an event, the method comprising:
    receiving a first information stream from a source by a parent first destination site comprising a first server connected to a first client device and connected to the source by a first connection;
    when at least one descendent second destination site comprising a second server connected to a second client device is connected to the parent first destination site in a second connection, transmitting a second information stream from the parent first destination site to the at least one descendent second destination site,
    wherein the first information stream is transmitted once between the source and the parent first destination site and the second information stream is transmitted once between the parent first destination site and at least one descendent second destination site,
    wherein the first client device connected to the first server of the parent first destination site is not the source and is connected only to the first server of the parent first destination site, and
    wherein the second client device connected to the second server of the descendant second destination site is connected only to the second server of the descendant second destination site.

2. The method of claim 1,
    wherein transmitting the second information stream from the parent first destination site to the at least one descendent second destination site is repeated for each descendent second destination site to which the second information stream is transmitted, such that:
    the parent first destination site becomes the source;
    the second destination site becomes the parent first destination site; and
    a product of processing the second information stream becomes the second information stream.

3. The method of claim 1, further comprising:
    transforming the first information stream into the second information stream.

4. The method of claim 3,
    wherein the transforming the first information stream into the second information stream comprises at least one of:
    multiplexing the first information stream with a third information stream;
    compressing the first information stream;
    decompressing the first information stream; and
    digitizing the first information stream.

5. The method of claim 1, further comprising:
    connecting an additional server during the event.

6. The method of claim 5,
    wherein the additional server is located in a third destination site different from the parent first destination site and the at least one descendent second destination site.

7. The method of claim 1,
    wherein the parent first destination site and at least one descendent second destination sites are connected in a dedicated connection.

8. The method of claim 1,
    wherein the first information stream is transmitted between the source and the parent first destination site and the second information stream is transmitted between the parent first destination site and at least one descendent second destination site via numbers of servers determined to be minimal among numbers of servers in multiple options.

9. The method of claim 1,
    wherein the second information stream is the first information stream.

10. The method of claim 1,
    wherein at least one client device is a computing platform.

11. The method of claim 1,
    wherein at least one server is a computing platform.

12. A tree-structured distributed system for distributing in a hierarchical communication network information during an event, the system comprising:
    a parent first destination site comprising a first server connected to a first client device and connected to a source in a first connection and receiving a first information stream from the source;
    at least one descendent second destination site comprising a second server connected to a second client device, the at least one descendent second destination site being connected to the parent first destination site in a second connection, the at least one descendent second destination site receiving a second information stream from the parent first destination site by the second connection,
    wherein the first information stream is transmitted once between the source and the parent first destination site and the second information stream is transmitted once between the parent first destination site and the second destination site,
    wherein the first client device connected to the first server of the parent first destination site is connected only to the first server of the parent first destination site, and
    wherein the second client device connected to the second server of the descendant second destination site is connected only to the second server of the descendant second destination site.

13. The system of claim 12,
    wherein the at least one descendent second destination site is behind a firewall and in the internet.

14. The system of claim 12,
    wherein the first server of the parent first destination site is connected to the second server of the at least one second destination site in a controlled connection.

15. The system of claim 14,
    wherein the first client connected to the first server of the parent first destination site is connected in a connection that is not controlled.

16. The system of claim 14,
wherein the second client connected to the second server of the at least one descendent second destination site is connected in a connection that is not controlled.

17. The system of claim 12,
wherein the first server of the parent first destination site is connected to the second server of the at least one second destination site in a dedicated connection.

18. The system of claim 17,
wherein the first client connected to the first server of the parent first destination site is connected in a connection that is not dedicated.

19. The system of claim 17,
wherein the second client connected to the second server of the at least one descendent second destination site is connected in a connection that is not dedicated.

* * * * *